April 29, 1947.  H. E. WEBBER  2,419,613
TUNED MICROWAVE WATTMETER
Filed Dec. 13, 1943   2 Sheets-Sheet 1
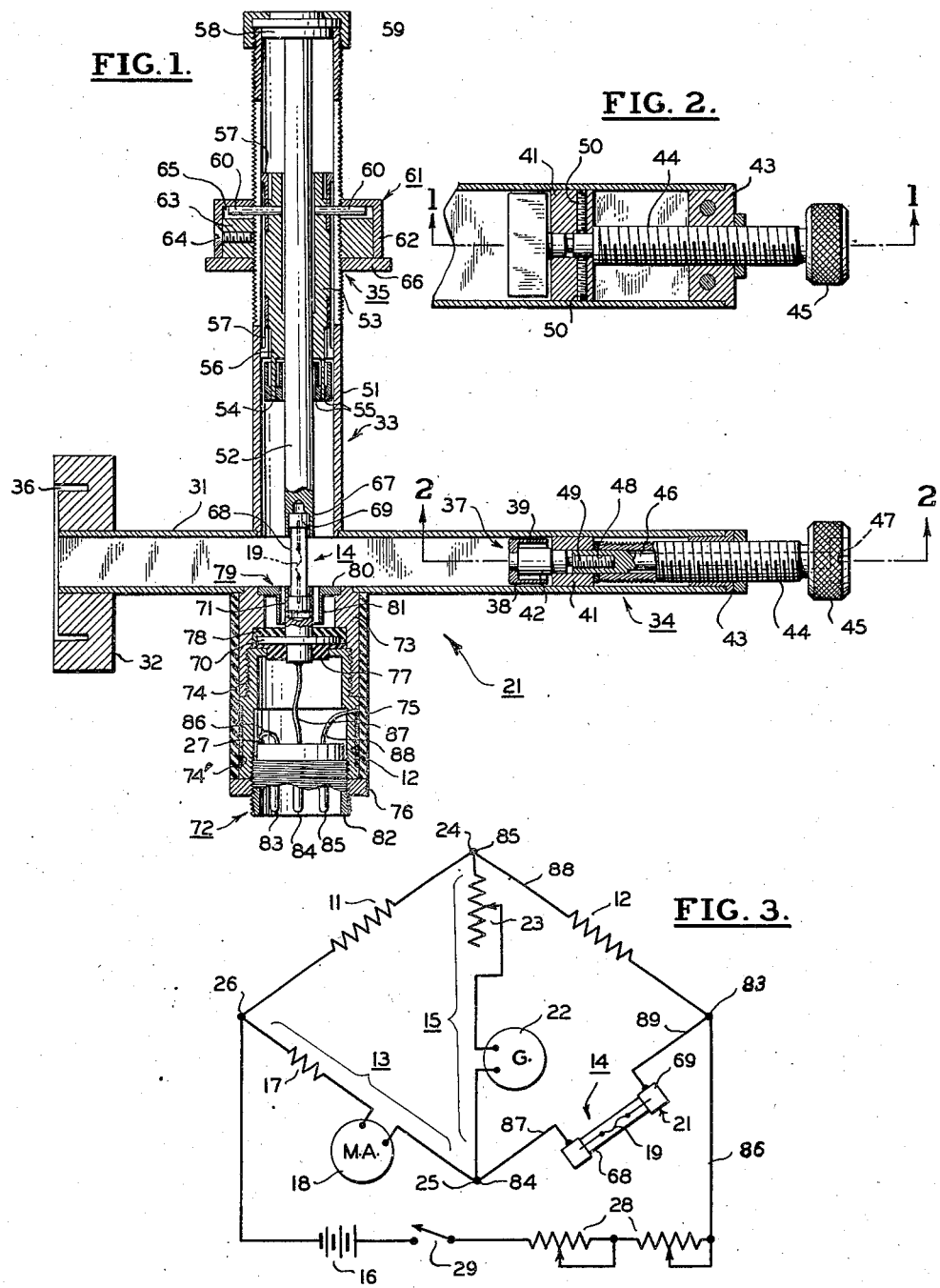
INVENTOR
HUGH E. WEBBER
BY
ATTORNEY April 29, 1947.     H. E. WEBBER     2,419,613
TUNED MICROWAVE WATTMETER
Filed Dec. 13, 1943     2 Sheets-Sheet 2
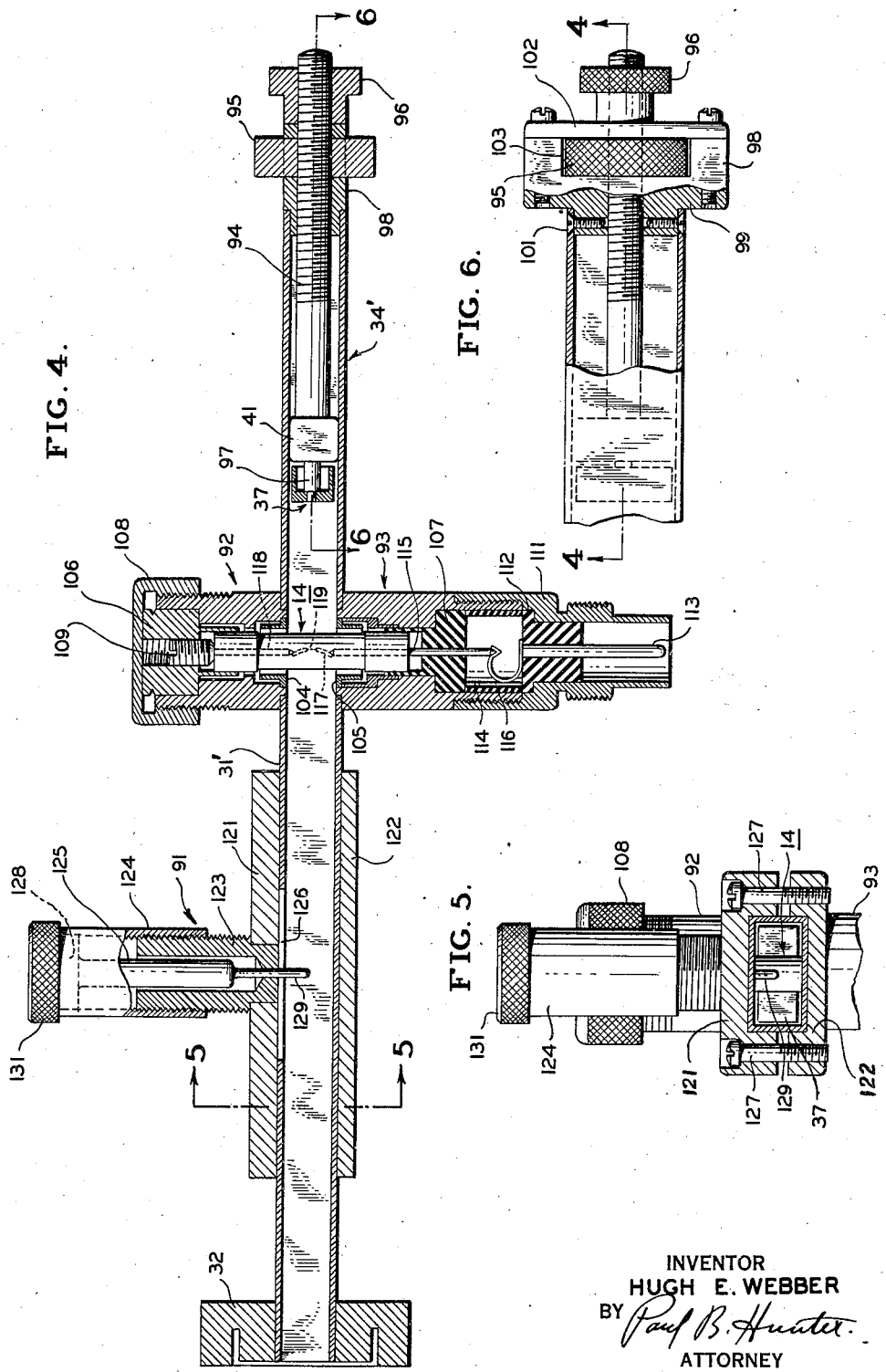
INVENTOR
HUGH E. WEBBER
BY Paul B. Hunter
ATTORNEY Patented Apr. 29, 1947

2,419,613

UNITED STATES PATENT OFFICE 2,419,613

TUNED MICROWAVE WATTMETER

Hugh E. Webber, Williston Park, N. Y., assignor to Sperry Gyroscope Company, Inc., a corporation of New York

REISSUED

Application December 13, 1943, Serial No. 514,111

10 Claims. (Cl. 178—44)

1

The present application is a continuation-in-part of my copending application Serial No. 513,164, filed December 6, 1943.

The present invention relates to tuned microwave wattmeters.

An object of my invention is to provide methods and apparatus for measuring power at frequencies in the microwave region.

More particularly, it is an object of my invention to provide a hollow pipe wave guide type of wattmeter.

Another object of my invention is to provide an improved arrangement for dissipating energy in a wave guide, for avoiding reflections from energy absorbing devices in the wave guide and for matching impedances in a wave guide.

It is an object to provide improved arrangements for coupling a power absorbing wire or filament to a wave guide.

Another object is to provide a microwave wattmeter having ambient temperature compensation.

Still another object of the invention is to provide wave guide apparatus which may be tuned by an adjustable probe.

A further object of the invention is to provide a mounting arrangement for a tuning probe with both axial and transverse adjustment.

Other and further objects and advantages of the invention will become apparent as the description proceeds.

In carrying out the invention in its preferred form, microwave energy, the power of which is to be measured, is conveyed through a hollow pipe wave guide type of transmission line and a power-absorbing hot wire such as a barretter wire is mounted athwart the wave guide.

Means are provided for matching the impedance of the barretter wire to the line.

For ascertaining the radio frequency power consumed in the barretter wire, direct current is supplied to it, means are provided for measuring the direct current power input, and means are provided for measuring the resistance of the wire and maintaining it constant by adjusting the supply of direct current. Variations in the direct current power required to maintain constant resistance then represent variations in radio frequency power supplied to the wire by the transmission line.

A better understanding of the invention will be afforded by the following detailed description, considered in conjunction with the accompanying drawings, wherein:

Fig. 1 is a view of a barretter wire holder for a microwave wattmeter shown as cut by a longitudinal plane;

Fig. 2 is a fragmentary view in longitudinal section of a portion of the apparatus of Fig. 1 represented as cut by a plane 2—2 of Fig. 1;

Fig. 3 is a circuit diagram of a bridge circuit which may be employed in conjunction with the apparatus of Fig. 1 for maintaining the direct-current (or low-frequency alternating-current) resistance of the variable wire and measuring the direct current power input thereto;

Fig. 4 is a longitudinal view of a barretter wire holder employing an adjustable probe for tuning;

Fig. 5 is a cross-sectional view of a portion of the apparatus of Fig. 4 cut by the plane 5—5 indicated in Fig. 4; and Fig. 6 is a fragmentary longitudinal sectional view of a portion of the apparatus of Fig. 4 as cut by a plane 6—6 in Fig. 4.

Like reference characters are utilized throughout the drawings to designate like parts.

In my aforesaid parent application, I have described a high frequency wattmeter employing a bridge circuit for measuring the direct current resistance of a barretter wire to which both alternating and direct currents are supplied. A similar bridge circuit may be employed in connection with the measurement of power of ultra high frequency energy conveyed through a hollow pipe wave guide type of transmission line. In my aforesaid application I have described suitable holders for barretter wires where the alternating current energy was conveyed through coaxial transmission lines. I also described suitable constructions for such barretter wires, particularly in connection with the measurement of low power, in which case a fine barretter wire was required.

In the present application wire holders are described for circuits in which radio frequency energy is supplied through wave guide transmission lines.

Summarizing from my aforesaid application, the bridge, as illustrated in Fig. 3 of the present application, comprises four arms 11, 12, 13 and 14, with a diagonal arm 15 and a current source 16. The arm 13 includes a resistor 17 and a current-responsive device such as a milliammeter 18 in series. The arm 14 comprises a barretter wire unit including a fine wire or filament 19 which constitutes the actual resistance of the arm 14 of the bridge. For supporting the wire 19 and making direct-current and microwave alternating-current connections, the wire 19 and the unit 14 containing it are mounted in a wire holder 21 represented schematically in Fig. 3 and shown in greater detail in Fig. 1 or Fig. 4. The diagonal arm 15 includes a galvanometer 22 and a sensitivity-adjusting rheostat 23 connected in series between conjugate points 24 and 25 of the bridge.

The direct current source 16 is connected to the remaining pair of conjugate points 26 and 83 of the bridge in series with direct current power adjusting rheostats 28 and a switch 29.

The resistors 11 and 12 may be standard resistors arranged to maintain substantially constant resistance, and the resistor 17 is so chosen as to have a resistance which, when added to the resistance of the milliameter 18, will produce a total resistance for the bridge arm 13 of a proper value to balance the bridge when the barretter wire 19 has a predetermined resistance corresponding to the maximum power input and temperature considered desirable for the barretter wire 19.

If ambient temperature compensation is desired, one of the resistors such as the bridge arm 12 will take the form of a compensating resistor mounted in proximity to the barretter wire unit 14 within the wire holder 21.

The wire holder shown in Fig. 1 comprises a self-shielding type of transmission line such as a rectangular hollow pipe wave guide 31 open at the left-hand end and having a choke coupling 32 mounted thereon for connecting the open end of the line to an input line and corresponding choke coupling (not shown). The narrow dimension of the wave guide 31 is that shown in Fig. 1, and the wide dimension is that shown in Fig. 2. Suitable supporting means are provided for mounting the barretter wire unit 14 athwart the wave guide 31 parallel to the narrow dimension thereof.

For enabling a direct current connection to be made to the barretter wire unit 14 without interposing radio frequency impedance in the line 31 or causing reflections therein, a short transverse line or lateral tuning stub 33 is provided. In the arrangement shown, the tuning stub 33 is of the concentric, substantially circular transmission line type. For tuning the lines and matching the impedance of the line to that of the barretter wire 19, the wave guide 31 is provided with a line-length adjusting mechanism 34 closing the right-hand end of the line 31, and the stub line 33 is provided with a corresponding adjusting mechanism 35.

The choke coupling 32 may be one of the type already known to those skilled in the art and illustrated and described in greater detail in the copending application of William A. Hayes, Serial No. 503,613, filed September 24, 1943. Briefly, such a choke coupling comprises a circular block having a rectangular opening fitted over the line 31 and having wave trap slots 36 cut therein, the slots 36 being a quarter-wave deep and a quarter wave distant from the edge of the line 31.

The adjusting mechanism 34 closing the right-hand end of the wave guide 31 comprises a quarter-wave trap 37 mounted within the guide 31 to form a short-circuiting plug which is adjustable in longitudinal position. The trap 37 comprises a hollow rectangular-shaped member with a base 38 slightly smaller than the internal dimensions of the wave guide 31 and having longitudinally extending sides or web portions 39 one quarter wave in length which serve as a wave trap and assure substantially zero impedance closure of the wave guide transmission line 31 substantially at the surface 38. For supporting the trap member 37, a positioning means is provided including a sliding block 41 having a slip fit within the wave guide 31, a supporting rod 42 staked into the base 38 of the trap member 37 and also inserted with a drive fit into an opening in the sliding block 41, and adjusting means such as a micrometer screw arrangement. The micrometer screw arrangement includes a block 43 secured in the end of the wave guide 31 and having a threaded opening, a hollow screw 44 having a knurled head 45, an internal screw 46 having a slotted head 47 and having a tapped opening 48 at the opposite end thereof, and a threaded extension 49 of the rod 42 fitting the tapped opening 48 of the internal screw 46. The screw head 45 is counterbored to receive the screw head 47 with a loose fit. Set screws 50 are provided to prevent the internal screw 46 from turning with respect to the screw 49 and the block 41.

The stub line 33 includes an outer hollow cylinder 51 and an inner conductor rod 52. The line-length adjusting mechanism 35 closing the end of the line 33 includes an axially movable hollow cylindrical block 53 fitting the center rod 52 and of slightly smaller diameter than the internal surface of the cylinder 51, having a toroidal or hollow cylindrical downward projection 54 carrying two wave trap members 55 secured and electrically connected to the member 54 at the lower end and extending upward with clearance so as to avoid contact with the internal rod 52, the outer cylinder 51, the supporting projection 54, or a shoulder 56 of the slidable member 53. For slidably supporting the member 53 within the hollow cylinder 51, ring-shaped shoe members 57 composed of suitable material such as brass are provided. For enabling the rod 52 to be supported at the upper end, it is formed with a head 58, and a cap 59 is provided which is adapted to clamp the head 58 against the top of the cylinder 51. For supporting the intermediate or lower portion of the rod 52 according to the position of the member 53, a relatively close slide fit is made between the member 53 and the rod 52.

For fixing the axial position of the member 53 with respect to the cylinder 51, the outer surface of the cylinder 51 is threaded. A pair of pins 60 is inserted in the member 53 with a drive fit, and a slotted positioning nut 61 is provided. The positioning nut 61 comprises a cup-shaped member 62 with an annular block 63 fastened therein, for example, by a machine screw 64 and spaced sufficiently from the base of the cup-shaped member 62 to form a slot 65 for receiving the pins 60. The inner surface of either the cup-shaped member 62 or the annular block 63 may be threaded to engage the outer surface of the hollow cylinder 51. If desired, a ring shaped lock nut 66 may also be provided. The cylinder 51 is fitted into the top surface of the wave guide 31 and mechanically and electrically connected thereto as by soldering or welding, a smooth internal joint being employed so as to maintain a flat internal surface for the wave guide 31.

The lower end of the rod 52 is countersunk and may also be slotted at one side to form a retaining spring socket 67 for the upper end of the barretter wire unit 14.

The unit 14, as shown, comprises an insulating tubular body 68 carrying a pair of ferrules 69 closing the ends of the tube 68 and electrically connected to the ends of the barretter wire 19. For supporting the lower end of the barretter unit 14, a second spring clip or socket 71 is provided, and for making direct current connections to the wire 19, a direct current connector 72 is provided. The supporting means for the lower socket 71 and the connector 72 include a hollow block 73 of substantially circular cross-section, a cup-shaped fitting 74, an insulating shell 75, a lock nut 76, and insulating bushings 77 and 78.

For the purpose of avoiding the interposition of a discontinuity in the microwave transmission line 31, a wave-trap in the form of a shouldered hollow cylinder 79 is provided. The block 73 is fitted into the lower surface of the wave guide 31 and mechanically and electrically connected thereto, and the member 79 is fitted into the top end of the member 73 so as to leave a flat lower surface of the wave guide 31. The member 79 is spaced from the lower barretter socket 71 and has an axial length of approximately a quarter wave so as to form a quarter-wave trap.

The hollow cylindrical quarter-wave trap 79 includes a flange 80 and a hollow cylindrical downwardly extending portion 81, the length of which is substantially equal to a quarter wave, and the portion 81 is spaced from the terminal socket 71.

The member 74 has a groove 74′ formed in the outer surface thereof to form a spool for receiving a winding of resistance wire forming the compensating arm 12 of the bridge shown in Fig. 3.

The connector 72 includes a threaded ring 82 threaded into the inner surface of the member 74 and secured by the lock-nut 76, and three connection pins, 83, 84 and 85. The connection pin 83 is electrically connected to the threaded ring 82 by a conductor 86. The center pin 84 is connected to the barretter wire spring socket 71 by a conductor 87, and the pin 85 is connected to one end of the compensating resistor wire 12 by a conductor 88, the other end of the wire 12 being connected to the metallic spool 74. It will be understood that insulated wire, such as enamel-covered wire, is utilized to form the resistor 12, and the surface of the groove 74′ may be insulated by a suitable coating such as a coating of enamel, porcelain, or aluminum oxide to provide further safeguards against short-circuiting turns of the resistor 12.

It will be understood that a suitable connector (not shown) cooperating with the connector 72 is utilized for connecting the pins 83, 84 and 85 to corresponding conductors or terminals of the bridge shown in Fig. 3. Thus, the bridge terminal 83 is represented in Fig. 1 by the connection of the conductor 86 to the metallic housing 82 of the connector 72 and the other metallic parts of the wire holder are represented in Fig. 3 by a conductor 89. The pin 84 is connected to the bridge terminal 25 and the pin 85 is connected to the terminal 26 of the bridge shown in Fig. 3.

A direct current connection including the wire 19 is thus formed from the pin 84 through the conductor 87, the socket terminal 71, the ferrule 69, the wire 19, the second ferrule 69, the spring socket contact 67, the post 52, the head 58, the cap 59, the outer cylinder 51 of the stub line 33, the wave guide 31, the members 73 and 74, the connector ring 82, the connection 27, and the conductor 26 back to the pin 83. Likewise, a connection to the compensating resistance arm 12 is formed from the pin 85 through the conductor 88, the wire 12, the grounded end of the wire, the member 74, the connector ring 82, the conductor 86 and the pin 83. The compensating wire 12 is thermally connected to the metal surrounding the barretter wire 19, through the members 74, 75, 79, 31 and 33.

It will be observed that the lower spring socket contact 71 is supported centrally of the portion 81 by means of its flange 70, which in turn is clamped between the insulators 77 and 78 by the member 74 threaded into the member 73. The barretter wire unit 14 may be installed or replaced by opening the holder at either the upper or the lower end. For example, if the holder is to be opened at the lower end, the lock-nut 76 and the member 74 are unscrewed; or if the holder is to be opened at the upper end, the cap 59 is unscrewed and the rod 52 is withdrawn to give access to the unit 14. Preferably, the spring pressure of the spring contact 67 is made greater than that of the spring contact 71 so that the unit 14 will be withdrawn with the rod 52.

When the position of the wave trap member 37 is adjusted by rotation of the knurled screw head 45, the internal screw remains fixed in angular position. The head 47 of the internal screw 46 limits leftward motion of the block 41 and the end of the hollow screw 44 limits motion of the block 41 to the right.

In the arrangement of Fig. 4 the supporting structure for the barreter unit 14 is made more compact by omitting the stub line 33 and instead providing a movable-probe adjusting mechanism 91 for tuning the line and matching impedance. As shown in Fig. 4, a rectangular hollow pipe wave guide 31′ is provided, having line-length adjusting mechanism 34′, upper and lower barretter unit supporting members 92 and 93, and the probe adjusting mechanism 91.

The mechanism 34′ includes the wave trap member 37 carried by a sliding block 41, the screw 94 rigidly secured to the block 41, an adjusting ring nut 95 and a lock nut 96. The member 37 is rigidly secured to the block 41 through a supporting post 97, and a ring nut retaining frame 98 is provided. The latter comprises a yoke-shaped block 99 (Fig. 6) secured in the end of the wave guide 31′ in a suitable manner as by means of screws 101 and a slot closing strap 102 screwed to the ends of the block 99 to form a nut retaining slot 103.

The barretter wire supporting members 92 and 93 are composed of a conducting material such as brass and are fitted into upper and lower openings in the wave guide 31′, being rigidly secured thereto by soldering, brazing, or the like. The members 92 and 93 have openings for receiving the unit 14, and flanged wave trap members 104 and 105 are fitted into the openings so as to leave flat upper and lower internal surfaces in the wave guide 31′. The members 104 and 105 are each a quarter wave in length, substantially, and are provided with sufficient clearance from the unit 14 and from the internal surfaces of the members 92 and 93 to form wave traps, thereby avoiding any discontinuities in the wave guide 31′ introduced by the presence of the opening for the barretter wire unit 14.

For securing the unit 14 in the members 92 and 93, an upper spring clip or socket 106 is provided which is fitted in the end of the member 92. A lower insulating socket member 107 is provided which is fitted into the member 93. A threaded cap 108 is provided for securing the clip 106 in the member 92, and a positioning screw 109 may be adjustably mounted in the member 106. A member 111 forming a lower cap and connector housing is threaded onto the member 93. To form a connector, an insulating bushing 112 is mounted in the housing 111 and a center pin 113 is centrally secured in the bushing 112. An insulating spacing cylinder 114 is provided for enabling the insulator 107 to be secured in the member 93 by means of the insulator 112 and the connector housing 11.

The barretter unit 14 is provided with a downwardly extending terminal pin 115, and a spring contactor 116 adapted to engage the pin 115 is secured to the top end of the connector pin 113.

As shown, the barretter wire unit 14 is of the Wollaston wire type having a silver-coated wire 117 electrically connected between the lower terminal pin 115 and an upper terminal pin 118, the center portion 119 of the coated wire being etched away to leave a fine filament of platinum or other resistant material which forms the actual resistance of the unit and corresponds to the resistor 19 of Fig. 3.

The probe adjusting mechanism 91 comprises a pair of channeled members 121 and 122 adapted to fit slidably over the upper and lower external surfaces of the wave guide 31', a hollow post 123 fitted into the channel block 121, a hollow nut 124 threaded to engage the outer surface of the post 123, and a center post 125.

A top opening 126 is provided in the upper wall of the wave guide 31' of sufficient length to allow longitudinal adjustment of the probe mechanism. Clamping screws 127 are provided for adjustably securing the probe mechanism 91 in the desired position along the wave guide 31' (Fig. 5). The center post 125 has a head 128 secured to the upper end of the hollow nut 124 and has a lower end 129 of reduced diameter to form a probe adapted to extend into the hollow wave guide 31'. The nut 124 is provided with a knurled head 131 at the upper end. The hollow post 123 has a reduced diameter opening fitting the probe 129, and a large diameter opening providing ample clearance for the larger diameter portion of the post 125. Rotation of the hollow nut 124 carrying the probe 129 serves for adjustment of the axial position of the probe 129, and the dimensions are such that the probe 129 may be moved a considerable distance into the wave guide 31' or substantially withdrawn therefrom.

The variation in the position of the probe 129 serves to match the impedance of the line 131' to the resistance wire 119 by varying in magnitude and phase the reflections from the probe 129 in such a manner as to cancel any reflections from wire 119.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a microwave wattmeter, in combination, a rectangular hollow wave guide adapted to receive microwave energy at one end and having an adjustable position closure at the other end, and a barretter mounting assembly intermediate the ends of the line, said mounting assembly including a concentric adjustable tuning stub line laterally extending in one direction from the wave guide and a connector assembly laterally extending in the opposite direction from said wave guide with a barretter unit mounted between said stub line and the connector assembly, said stub line including a center conductor with a connection socket for the barretter unit in the end thereof and said connector assembly including a second connection socket for said barretter unit insulated from the wave guide.

2. Apparatus as in claim 1, in which a hollow cylindrical quarter-wave trap is provided surrounding the second connection socket for the barretter unit.

3. Apparatus as in claim 1, including a compensating resistor mounted in thermal connection with the wave guide for providing an ambient temperature compensation.

4. In a microwave wattmeter a hollow wave guide adapted to receive microwave energy, said guide having an opening at the center thereof with a barretter wire unit mounted therein athwart the wave guide, and members on either side of the wave guide for supporting said barretter wire unit including wave trap means for preventing electrical discontinuity in the wave guide.

5. In combination, a hollow-pipe wave guide, a barretter wire mounted in the wave guide, and a temperature compensating resistor in thermal association with the wave guide, said barretter wire and said resistor being so connected in a bridge circuit that said resistor provides ambient temperature compensation for said barretter wire.

6. In a microwave wattmeter, a hollow pipe wave guide having an input end through which it is adapted to receive microwave energy to be measured, a barretter wire mounted in the wave guide, and an impedance-matching probe mounted between the input end of the wave guide and the barretter wire.

7. Apparatus as in claim 6, in which the probe is provided with longitudinal adjustment for determining its position along the wave guide and axial adjustment for determining its degree of insertion into the wave guide.

8. In combination, a hollow pipe wave guide having opposite walls with openings therein, a barretter wire unit mounted athwart the wave guide extending through said openings, and choke means for said openings arranged to prevent discontinuities in said wave guide.

9. Apparatus as in claim 8, wherein one of said choke means is a quarter wave trap.

10. In a microwave wattmeter, in combination, a self-shielding transmission line having an input end, a barretter wire therein, and an impedance-matching probe for said line located between said input end and said barretter wire.

HUGH E. WEBBER.

REFERENCES CITED

The following references are of record in the file of this patent:

UNITED STATES PATENTS

| Number | Name | Date |
|---|---|---|
| 2,081,044 | Runaldue | May 18, 1937 |
| 1,407,147 | Goodwin | Feb. 21, 1922 |
| 1,612,076 | Taylor | Dec. 28, 1926 |
| 2,199,247 | Rich et al. | Apr. 30, 1940 |
| 2,296,678 | Linder | Sept. 22, 1942 |
| 2,088,749 | King | Aug. 3, 1937 |
| 2,151,157 | Schelkunoff | Mar. 21, 1939 |
| 2,197,122 | Bowen | Apr. 16, 1940 |
| 2,365,207 | Moles | Dec. 19, 1944 |
| 2,106,713 | Bowen | Feb. 1, 1938 |
| 2,232,179 | King | Feb. 18, 1941 |